United States Patent
Gonçalves Dias Ponzi et al.

(10) Patent No.: US 12,410,356 B2
(45) Date of Patent: Sep. 9, 2025

(54) HYDRAULIC CEMENT COMPOSITION, PROCESS AND USE

(71) Applicants: União Brasileira de Educação E Assistência—Mantenedora da PUCRS, Porto Alegre (BR); Petróleo Brasileiro S.A.—PETROBRAS, Rio de Janeiro (BR)

(72) Inventors: Gabriela Gonçalves Dias Ponzi, Porto Alegre (BR); Felipe Dalla Vecchia, Porto Alegre (BR); Sandra Mara De Oliveira Einloft, Porto Alegre (BR); Marta Kerber Schütz, Porto Alegre (BR); Victor Hugo Jacks Mendes Dos Santos, Porto Alegre (BR); Darlan Pontin, Porto Alegre (BR); Renan Bordulis Martel, Porto Alegre (BR); Amanda Sofia De Guimarães E Stepanha, Porto Alegre (BR); Dellyo Ricardo Dos Santos Alvares, Porto Alegre (BR); Sonia Maria Cabral De Menezes, Rio de Janeiro (BR); Ana Paula Santana Musse, Rio de Janeiro (BR)

(73) Assignees: União Brasileira de Educação E Assistência—Mantenedora da PUCRS, Porto Alegre (BR); Petróleo Brasileiro S.A.—PETROBRAS, Rio de Janeiro (BR)

( * ) Notice: Subject to any disclaimer, the term of this patent is extended or adjusted under 35 U.S.C. 154(b) by 0 days.

(21) Appl. No.: 18/628,248

(22) Filed: Apr. 5, 2024

(65) Prior Publication Data
US 2024/0279530 A1 Aug. 22, 2024

Related U.S. Application Data

(62) Division of application No. 17/661,513, filed on Apr. 29, 2022, now Pat. No. 11,981,860.

(30) Foreign Application Priority Data

Apr. 30, 2021 (BR) ...................... 10 2021 008503 7

(51) Int. Cl.
*C09K 8/493* (2006.01)
*C04B 7/13* (2006.01)
(Continued)

(52) U.S. Cl.
CPC ................ *C09K 8/493* (2013.01); *C04B 7/13* (2013.01); *C04B 7/40* (2013.01); *C04B 7/522* (2013.01);
(Continued)

(58) Field of Classification Search
None
See application file for complete search history.

(56) References Cited

U.S. PATENT DOCUMENTS

| 11,981,860 B2 * | 5/2024 | Gonçalves Dias Ponzi ................ C04B 7/527 |
| 2006/0213664 A1 * | 9/2006 | Chatterji ................ C04B 28/08 166/309 |

(Continued)

FOREIGN PATENT DOCUMENTS

| CN | 102701615 A | 10/2012 |
| CN | 102674782 B | 7/2013 |

(Continued)

OTHER PUBLICATIONS

Kahila Mokhtari Jadid, "Chemical alteration of oil well cement with basalt additive during carbon storage application", Master of Science in Petroleum and Natural Gas Engineering Department, Middle East Technical University, Dec. 2011, 113 pages.
(Continued)

*Primary Examiner* — Andrew Sue-Ako
(74) *Attorney, Agent, or Firm* — ArentFox Schiff LLP

(57) ABSTRACT

The present invention describes a hydraulic cement composition, process and use thereof, wherein the composition comprises a hydraulic cement composition with increased resistance against carbon dioxide ($CO_2$) for application in reservoirs such as oil and gas and carbon capture and storage (CCS) wells; with improved performance of cement paste formulations as a material for application in primary, secondary cementing, recovery and/or plugging operations, of reservoirs/wells that operate with high $CO_2$ content; as a technological alternative to guarantee the integrity of wells in $CO_2$-rich environments for long periods of time, without any additional intervention to the already current operational procedures for cementing wells, and with cost reduction in relation to class G cement (currently, the main raw material); and sufficient chemical resistance to carry out enhanced oil (EOR) and gas (EGR) recovery by injecting high levels of $CO_2$, increasing reservoir pressure throughout the extraction period of hydrocarbon reservoirs.

13 Claims, 8 Drawing Sheets

(51) Int. Cl.
| | | |
|---|---|---|
| *C04B 7/40* | (2006.01) | |
| *C04B 7/52* | (2006.01) | |
| *C04B 28/02* | (2006.01) | |
| *C09K 8/42* | (2006.01) | |
| *E21B 33/13* | (2006.01) | |
| *C04B 111/00* | (2006.01) | |
| *C04B 111/22* | (2006.01) | |

(52) U.S. Cl.
CPC .............. *C04B 7/527* (2013.01); *C04B 28/02* (2013.01); *C09K 8/426* (2013.01); *E21B 33/13* (2013.01); *C04B 2111/00275* (2013.01); *C04B 2111/00663* (2013.01); *C04B 2111/22* (2013.01)

(56) References Cited

U.S. PATENT DOCUMENTS

2016/0159689 A1* 6/2016 Burgel .................... C04B 26/06
 524/789
2021/0032162 A1* 2/2021 Lake ........................ F27B 15/14

FOREIGN PATENT DOCUMENTS

| CN | 102659337 B | 1/2014 |
|---|---|---|
| CN | 105541263 A | 5/2016 |
| CN | 106116316 A | 11/2016 |

OTHER PUBLICATIONS

L Paiva, I Ferreira, A Martinelli, J Freitas, U Bezerra, Milled basalt fiber reinforced Portland slurries for oil well applications,Journal of Petroleum Science and Engineering, 175(2019) 184-189, 2019.

L Laibao, Z Yunsheng, Z Wenhua, L Zhiyong, Z Lihua, Investigating the influence of basalt as mineral admixture on hydration and w microstructure formation mechanism of cement, Construction and Building Materials, 48, 2013.

Dobiszewska, Magdalena & Szoldra, Paulina. (2019). Effect of basalt powder addition on properties of mortar. MATEC Web of Conferences, 2019.

Mesh to Micron Conversion Chart [retrieved from the internet at Dec. 1, 2023 from <URL:http://www.filtersolutions.com/pdf/mesh%2oto%20micron%20conversion%20chart.pdf>] (Year: 2017).

Oliveira, Aline & Dweck, Jo & Fairbairn, Eduardo & Gomes, Otavio & Toledo Filho, Romildo. (2019). Crystalline admixture effects V on crystal formation phenomena during cement pastes' hydration. Journal of Thermal Analysis and Calorimetry. 15. 10.1007/s10973-019-08745-0. (Year: 2019).

\* cited by examiner

HYDRAULIC CEMENT COMPOSITION, PROCESS AND USE

CROSS REFERENCE TO RELATED APPLICATIONS

This application is a division of U.S. patent application Ser. No. 17/661,513, filed Apr. 29, 2022, which claims priority to Brazilian Patent Application No. 1020210085037, entitled "HYDRAULIC CEMENT COMPOSITION, PROCESS AND USE" and filed on Apr. 30, 2021, the disclosures of each of which are incorporated herein by reference in their entireties.

FIELD OF INVENTION

The present invention describes a hydraulic cement composition, its obtaining process and its use. More precisely, the composition comprises a hydraulic cement composition with increased resistance against carbon dioxide ($CO_2$) for application in reservoirs such as oil and gas and carbon capture and storage (CCS) wells. The present invention pertains to the fields of Engineering and Geology.

BACKGROUND OF THE INVENTION

Oil and gas exploration has been advancing towards increasingly deeper reservoirs, which present more extreme conditions of temperature and pressure. By advancing the frontiers of oil and gas development and exploration to more challenging reservoirs and more adverse environments, companies are now dealing with greater risks and exploration costs, as well as managing greater exposure to the uncertainties of the enterprise, which requires robust financial and environmental risk mitigation strategies and techniques.

A wide variety of purposes is behind the construction of wells to access the subsoil, including the exploration of hydrocarbons and the geological storage of $CO_2$. Accordingly, well integrity is a crucial issue in the life cycle of any enterprise that involves drilling deep sections of subsurface formations. In this way, the failure in the integrity of the well leads not only to negative financial consequences, but also to the occurrence of significant environmental impacts, such as contamination of groundwater and leakage of fluids to the surface.

In this context, the Pre-Salt is one of the most significant recent discoveries of oil reserves in the world. The Santos Basin Pre-Salt Cluster is a unique scenario as it is a source of microbial carbonate reservoirs with unconventional origin and properties. The thick layer of salt, which acts as a seal, the high distances from the coast, the depths of the reserves, the variable (but often high) $CO_2$ content of the gas associated with the oil, and the existence of few known analogous reservoirs, make difficult the prediction of behavior of the enterprise, productivity of reservoirs and integrity of already-drilled wells.

Many studies have shown that Portland cements, commonly used for cementing oil and gas wells, are thermodynamically unstable in $CO_2$-rich media, such as Pre-salt reservoirs. The process of cement degradation by the action of $CO_2$ is known and well documented, and the reaction is initiated with the dissolution of calcium hydroxide [$Ca(OH)_2$], resulting in the formation of calcium carbonate ($CaCO_3$) and bicarbonate of calcium [$Ca(HCO_3)_2$]. The latter can be leached from the cement matrix due to its high solubility in the acidic medium, resulting in an increase in porosity/permeability and reducing the mechanical strength of the cement, with a possible loss of structural integrity and consequent leakage of $CO_2$ and hydrocarbons into the medium.

In this sense, in addition to studies to evaluate the behavior of seal rocks/reservoirs and materials that are currently applied in the construction of wells against the action of $CO_2$, it is of great importance to propose the development of a portfolio of options that aim at adapting and/or replacing the materials currently used to minimize possible interventions to correct problems in wells due to the leakage of stored fluids, caused by the effect of the high concentration of $CO_2$ inside the reservoirs and around the wells.

Thus, new options for cement formulations with mineral fillers are being sought and studied in order to obtain alternative materials for application in well cementation, aiming at reducing the permeability/porosity of the material to the exposure of the medium, increasing the integrity and life cycle of the well, reducing environmental impacts, minimizing corrective actions and reducing the overall cost of operating wells in $CO_2$-rich reservoirs, such as those found in the Brazilian Pre-salt.

With respect to the technologies currently in use, there can be mentioned some cement pastes based on Portland cement, such as, for example: ordinary Portland cement, Portland cement with medium sulfate resistance, Portland cement with high sulfate resistance or a mixing of said base pastes, all of them in accordance with the definitions determined by ABNT, NBR 9831: CPP—Class G cement with high resistance to sulfates (HRS); CPP—Special grade of moderate sulfate resistance (MRS); CCP-AT—Portland cement intended for cementing oil wells in high temperature scenarios (Type I) and crystalline silica (minimum crystalline silica content of 26% in relation to the mass of CCP-AT cement); CCP-AT—Portland cement intended for cementing oil wells in high temperature scenarios (Type II) and crystalline silica (minimum crystalline silica content of 29% in relation to the mass of CCP-AT cement); CCP-BT—Portland cement intended for cementing oil wells in low temperature scenarios. In addition to these, as provided for by ABNT NBR 9831, commercial cementitious materials such as EverCRETE $CO_2$ (Schlumberger) and Termalock (Halliburton) are also available for this purpose.

The present invention differs from the others mentioned in terms of ease of addition of the material, with few interventions and/or modifications in the Portland cement process, further being from low-cost raw material, high availability, and that results in an increase in the chemical resistance of the obtained cement paste and when exposed to large concentrations of $CO_2$ in extreme conditions of temperature and pressure, such as those found in deep geological formations.

Regarding the researched literature, the search was carried out in the bases of the main worldwide patent offices, and some documents of the state of the art showed some degree of similarity with the present technology. The most relevant documents and their main differences will be mentioned below.

The document by MOKHTARI JADID, titled Kahila. *Chemical alteration of oil well cement with basalt additive during carbon storage application* (2011), discloses the use of basalt in cement formulations for wells with high $CO_2$ content. It differs from the present invention because the basalt powder used in the present invention has standardized characteristics in relation to its quality control and stability, having been widely characterized, ensuring the reproducibility of the formulations and comprising a lower basalt powder concentration range, but still further with high functional performance in relation to that evidenced in the document by MOKHTARI JADID. Regarding the $CO_2$ degradation test conditions, the present invention comprised the exposure of the composition to more aggressive conditions (ultrapure water and 150 bar (15.0 MPa)×synthetic saline solution and 75.8 bar (7.58 MPa)), demonstrating tolerance to greater amounts of $CO_2$ and to application pressure (depth), in addition to promoting a reduction in the financial and logistical impact in relation to the final product and its obtaining process, when compared with the document by MOKHTARI JADID.

The document CN105541263A describes a type of concrete and its form of obtaining, the product being resistant to an acidic medium and with anti-seepage activity, comprising: 380 to 470 parts of cement, 530 to 630 parts of quartz sand, 800 to 900 parts of basalt, 175 to 190 parts of water, 30 to 40 parts of coal gangue micro powder, 70 to 80 parts of coal ash, 60 to 70 parts of silica fume, 280 to 330 parts of water glass, 200 to 250 parts of synthetic cement, 35 to 45 parts of sodium fluosilicate, 5 to 9 parts of hollow glass fiber and 8.1 to 12.2 parts of additive. It differs from the present invention in that it does not comprise basalt as an additive in cement paste, but rather because it is used as a coarse aggregate to concrete, whose intended use is in the civil construction industry and in fractions higher than those required by the invention.

The document CN102659337B describes a construction material comprising Portland cement, green clay and particulate basalt tailings, comprising particles smaller than 50 mm and its method of preparation. It differs from the present invention in that it is used in an anhydrous cement composition, with basalt being crushed into pieces up to 5 cm, among other materials, producing a more sustainable cement powder than that currently suggested by the standards, as an alternative to Portland cement, more used in the civil construction industry.

The document CN106116316A describes a high performance oil well cement comprising the following components by weight: 25-40 parts of cement, 0.5-1 part of propylbenzene emulsion, 1.5-2.5 parts of pp fibers, 12-20 parts of sand, 9-16 parts of asphalt mastic, 7-18 parts of basalt, 8-15 parts of styrene-butadiene, 5-7 parts of polyoxyethylene alkylphenol ether sodium sulfate, 2-6 parts of calcium sulfoaluminate expansion agent, 14-20 parts of perlite, 2-4 parts of bentonite, 10-16 parts of sodium abietate, 2-4 parts of styrene-butadiene rubber emulsion, 2-4 parts of sepiolite, 8-15 parts of slag powder and 4-8 parts of waterproofing cement. Such a product is resistant to permeability and corrosion, presents good stability at high temperature and has a high perspective of application in increasing the strength in cementation. However, it is not detailed how the basalt rock is used, its granulometry, its function as aggregate or a supplementary cementitious material, being distinct from the present invention. In addition, it has a basalt fraction higher than that required in the present invention and comprises different components.

The document CN102701615A describes a method for the production of Portland cement with basalt, aiming at solving the problems of low mechanical strength in conventional Portland cement. The method comprises Portland cement, gypsum and basalt powder being: 5-7% basalt powder, 26-28% Portland cement powder and 6% gypsum, resulting in the improvement of the initial strength of Portland cement. It differs from the present invention in that it uses basalt in the clinker grinding process to obtain a new cement powder.

The document CN102674782B describes a method for preparing a cementitious material comprising basalt powder, slag powder and limestone powder, respectively at 400~600 m²/kg, 500~800 m²/kg and 600~900 m²/kg, showing high efficiency, durability and resistance to shrinkage, frost, sea water and erosion. It differs from the present invention because it is not used for the purpose of increasing chemical resistance to $CO_2$, in addition to the specific area of the basalt powder of the invention being higher (4000-6000 m²/kg) than that described in the document.

From what can be understood from the researched literature, no document anticipates the present teachings, and the present invention presents novelty and inventive step in face of the state of the art.

SUMMARY OF THE INVENTION

In a first aspect, the object of the present invention is a hydraulic cementitious composition, resistant to carbon dioxide ($CO_2$), comprising basalt powder (BP) as a supplementary cementitious material (SCM) in dry base cement powder, wherein the cement powder is preferably of the chemical composition indicated by the American Petroleum Institute (API) of classes A-H and/or according to the standard indicated by the American Society of Testing Materials (ASTM).

In a preferred embodiment, the basalt powder is obtained from the group selected from artificial basaltic rocks, ballast, chips, crushed stone, coarse aggregate and/or fine aggregate.

In a preferred embodiment, the basalt powder comprises, mostly, the components selected from the group of Andesine, Augite, Orthoclase and Quartz, Sanidine, Magnetite, Ilmenite, Iron Forsterite and/or Goethite.

In a preferred embodiment, the basalt powder comprises a concentration ranging from 0.01 to 9.99% by weight of dry base cement powder.

In a preferred embodiment, the basalt powder comprises a supplementary cementitious material of pozzolanic activity up to 330 mg of $Ca(OH)_2$ consumption.

In a preferred embodiment, the basalt powder has a particle size equivalent to the fraction passing through a #325 mesh sieve, up to 0.044 mm and 4000 to 6000 m²/kg.

In a preferred embodiment, the particle size of BP is up to 80% smaller than class G cement.

In a preferred embodiment, the basalt powder comprises an average specific surface area of 4000 to 6000 m²/kg and an average particle size of 13,316 to 8,877 Å.

In a preferred embodiment, the composition comprises a chemical resistance gain of up to 31.2% to $CO_2$ degradation due to low porosity and permeability.

In a preferred embodiment, the composition decreases the permeability and porosity of the material in an acidic medium in subsurface.

In a second aspect, the object of the present invention is a process for obtaining said composition, comprising the steps of:
  a. Milling of basalt, a civil construction aggregate, until obtaining a powder;
  b. Sieving of the obtained powder;
  c. Dry physical mixing of the powder with the base cement, until completely homogenized;
  d. Preparation of cementitious material, from the mixture of step c) with hydration water and additives, forming a cement paste with additives;

e. Adjustment of the concentration to obtain the properties of the desired paste with additives, in terms of pumpability, setting time, density and mechanical strength, in order to adapt to the parameters of the standard;

f. Carrying out cementation, re-cementing and/or plugging.

In a preferred embodiment, the basalt is milled in an industrial ball mill.

In a preferred embodiment, the water/cement ratio is 0.30 to 0.50, on a dry basis, without compensation for the basalt powder content.

In a preferred embodiment, the total amount of additives comprises the range of 0.001 to 40% by weight of cement paste, according to current regulations and specification of the reservoir.

In a third aspect, the object of the present invention is the use of the composition for primary, secondary cementing, recovery and/or plugging of reservoirs, in subsurface, whether on land (onshore) or at sea (offshore), in an embodiment as the Pre-salt.

In a preferred embodiment, the use of the composition is for injection, exploration, monitoring, production and/or enhanced recovery (EOR/EGR) reservoirs.

In one embodiment, the reservoirs are for fluids, preferably with high content of hydrocarbons, $CO_2$, oil and gas.

In a preferred embodiment, the concentration of the gaseous fraction of $CO_2$ varies between 5% and 100%.

In another embodiment, the reservoirs are for carbon capture and storage (CCS).

In a preferred embodiment, the conditions of use are at a temperature between 4° C. and 260° C. and a pressure between the atmospheric pressure and 34 MPa.

DETAILED DESCRIPTION OF THE INVENTION

The present invention proposes a hydraulic cementitious composition comprising basalt powder (BP) as a supplementary cementitious material (SCM) for oil and gas wells and for carbon capture and storage (CCS) operations. The hydraulic cementitious composition was designed by evaluating the integrity of different cement paste formulations, prepared from a mixture of API class G and BP cement as an SCM. The formulations were prepared from the addition of BP contents of 0.25% (BP 0.25) and 0.50% (BP 0.50) by weight of used cement powder and used in the preparation of test specimens, and later, they were submitted to a $CO_2$ degradation test, under supercritical conditions, simulating the environment of oil and gas reservoirs of Pre-salt and CCS.

From the experimental results, it was identified that BP can be considered as a filler-pozzolanic SCM, presenting low pozzolanic activity, large inert fraction and significantly smaller particle size than class G cement (base of formulations of cement provided for by NBR 9831). In this way, the composition can be applied to primary and secondary cementing operations, recovery and/or plugging of reservoirs/wells drilled in subsurface geological formations, whether on land (onshore) or at sea (offshore), with the objective of prolonging the useful life cycle of wells (oil and gas and CCS reservoirs) in operation (active) and/or of new wells drilled. Said reservoirs comprise injection, exploration, monitoring and/or fluid production wells, preferably oil and gas wells, onshore and offshore, with high content of hydrocarbons and/or $CO_2$ of gaseous fraction ranging from 5% to 100%, such as for example, the Pre-salt wells.

The composition showed high potential for application in such reservoirs/wells as it is more resistant to $CO_2$ degradation, presents low porosity and mechanical properties well suited to the subsurface environment, evidenced by $CO_2$ degradation tests and compression tests. From the characteristics of BP, it is concluded that the increase in chemical resistance of the cement paste composition is due to the reduction of porosity and permeability of the material in relation to the composition without BP, due to the filling of voids and the refinement of the pore network of the cement paste, combined with the low reduction in the alkaline reserve of portlandite in the base paste (API class G cement).

Thus, the combination of these characteristics increased the resistance of the cementitious material to the intrusion of fluids, reduced the advancement of degradation by the presence of $CO_2$ and preserved the ability of the cement matrix to delay the reaction of acidic gases. In this way, it was found that the addition of BP to cement paste formulations improves the integrity of the reservoir/well, extends its life cycle and reduces the need for corrective interventions throughout the process of operating wells drilled in $CO_2$-rich environments, such as the Pre-salt reservoirs.

The main advantages related to the composition, in addition to the technical aspects evidenced, are: (i) improved performance of cement paste formulations as a material for application in primary, secondary cementing, recovery and/or plugging operations, of reservoirs/wells that operate with high $CO_2$ content, such as Pre-salt oil and gas reservoirs, as well as carbon geological storage; (ii) it is a technological alternative to guarantee the integrity of wells in $CO_2$-rich environments for long periods of time, without any additional intervention to the already current operational procedures for cementing wells, and with cost reduction in relation to class G cement (currently, the main raw material); and (iii) sufficient chemical resistance to carry out enhanced oil (EOR) and gas (EGR) recovery by injecting high levels of $CO_2$, increasing reservoir pressure throughout the extraction period of hydrocarbon reservoirs.

The formulation comprising 0.25% Basalt Powder demonstrated the best technical performance (31.2% reduction of the degraded layer), in addition to being the SCM with the lowest production cost (R$ 0.0034 per kilogram), indicating that this formulation is the one with the greatest potential for implementation in the short term. Additionally, it presents the lowest technical barrier to implementation in large-scale cementing operations, since the technological modifications in the preparation of cement paste, in relation to current operations, result in minimal intervention and modification in the production chain of formulations, and no alteration in cementing practices/equipment currently performed on the platform/field. Thus, the application can be carried out in a short period of time, with no need for adaptations in the structures and methods of currently-used well cementing operations.

Figure 6:
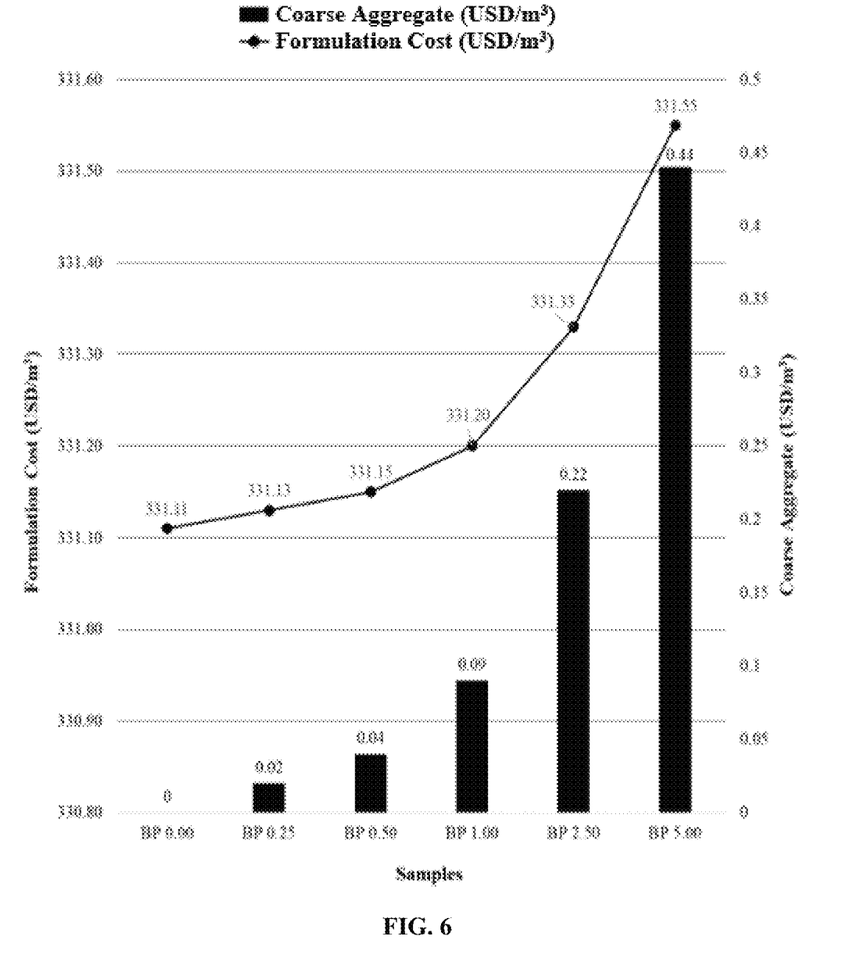
FIG. 6 demonstrates a financial evaluation from the formulations comprising basalt powder. The base price used in the valuation for Class G cement was US$ 0.27 (R$ 1.49) per kg, as reported by LafargeHolcim Brasil (base year 2019). The price of the coarse aggregate was US$ 8.65 (R$ 47.00) per cubic meter ($m^3$), obtained from the SINAPI Brazilian civil construction report (prices and cost references—July 2020).

Additionally, its implementation determines a medium to long-term financial gain, due to the savings regarding corrective interventions throughout the life cycle of the wells, since each avoided intervention saves an amount in the order of USD 3 million per well. For purposes of determining the amounts, a financial evaluation was carried out. Thus, FIG. 6 demonstrates a comparison of the cost per $m^3$ of the different well cement paste formulations evaluated with the addition of basalt powder mass fractions (from 0.25 to 5% by weight). As can be seen, there is a tendency for a slight increase in formulation costs as the basalt powder fraction is increased from 0 to 5% by weight. The formulation cost increase ranges from US$ 0.02 (BP 0.25) to US$ 0.44 (BP 5.00) per metric ton ($m^3$) of well cement paste formulation.

From the financial evaluation and considering the formulations with lower levels of basalt powder (BP 0.25 and BP 0.50), which showed better properties in a $CO_2$-rich environment, it is concluded that the cost increase would be easily compensated by increased long-term well integrity. Thus, the formulations that showed better chemical resistance (BP 0.25) and mechanical strength (BP 0.50) showed insignificant additional costs (per $m^3$) in relation to the formulation of the reference cement paste (Class G cement-BP 0.00), demonstrating that, in addition to the technical properties obtained, the BP also determines an SCM with an interesting cost/benefit ratio to be applied in chemical-resistant cement paste composition for CCS wells. In this way, the product presents a negligible cost increase in relation to the one currently used (only the API class G cement), which, in line with a low production cost (R$ 0.0034 per kilogram), when added to the standard formulation, determines improvements in chemical resistance (31.2% reduction in the degraded layer) of formulations in environments with high concentrations of $CO_2$.

Its intermediate stage of development comprises information from $CO_2$ degradation tests of short and average duration and extensive characterization of the chemical and mechanical properties of the new formulations. As following steps, the material will go on to long-term tests, tests in HTHP (high temperatures-high pressures) conditions and pilot scale tests, adding even more value to the technology, so that it can be quickly implemented into the market.

The examples presented herein are intended to demonstrate the different possibilities of variations, without, however, limiting or restricting the scope and the different ways of obtaining the present technology.

Example 1. Preferred Embodiment

Next, the processes and methods necessary for the application of the present invention on a large scale will be detailed. It should be noted that the only steps that are added in relation to current practices are the preparation of basalt powder (BP) and the mixture of components (cement and BP).

The present hydraulic cementitious composition is obtained in a simple way from a dry blending process of base cement powder (class G) and BP, in a concentration of 0.01 to 9.99% by weight of cement powder. As it is a simple physical mixture between the components, the dry powder mixture can be prepared directly by the cement company or be mixed beforehand, before shipment to the drilling platforms that are operating offshore. Thus, the previous processes for preparing the basalt powder (mining, milling and sieving) and the dry blending of the components (class G cement and BP) are the only additional steps in relation to current technology, and can be carried out by different companies in the segment, either by the Oil and Gas industry, or by the cement company and/or the responsible for mining and preparing the BP.

Hydraulic Cementitious Composition and Formulations
Base Cement

The base cement powder considered in the present invention is API class G cement, whose composition complies with ABNT NBR 9831: "Portland cement intended for cementing oil wells-Specification". The main components of class G cement are $C_3S$ ($3CaO \cdot SiO_2$), $C_2S$ ($2CaO \cdot SiO_2$), $C_3A$ ($3CaO \cdot Al_2O_3$) and $C_4AF$ ($4CaO \cdot Al_2O_3 \cdot Fe_2O_3$), wherein $C_3S$ is the main component and most responsible for the development of the initial mechanical strength properties of the cement paste.

However, for the purposes of different embodiments, the dry base cement powder may comprise any chemical composition indicated by the American Petroleum Institute (API) in class A-H and the American Society for Testing and Materials (ASTM).

Basalt Powder (BP):

The used base basalt powder (BP) can be obtained from aggregates for civil construction (artificial basalt rocks, ballast, chips, crushed stone, coarse aggregate and/or fine aggregate), and is prepared from a process of milling and sieving. BP is obtained by milling the civil construction aggregate, preferably in an industrial ball mill. After milling, the powder should be sieved to a particle size equivalent to the fraction passing through a #325 mesh sieve. Thus, only the fraction passing through the #325 mesh sieve should be used as SCM to compose the cement paste formulations of the present invention. The usage concentration varies within the range of 0.01 to 9.99% by weight of cement powder.

Figure 7:
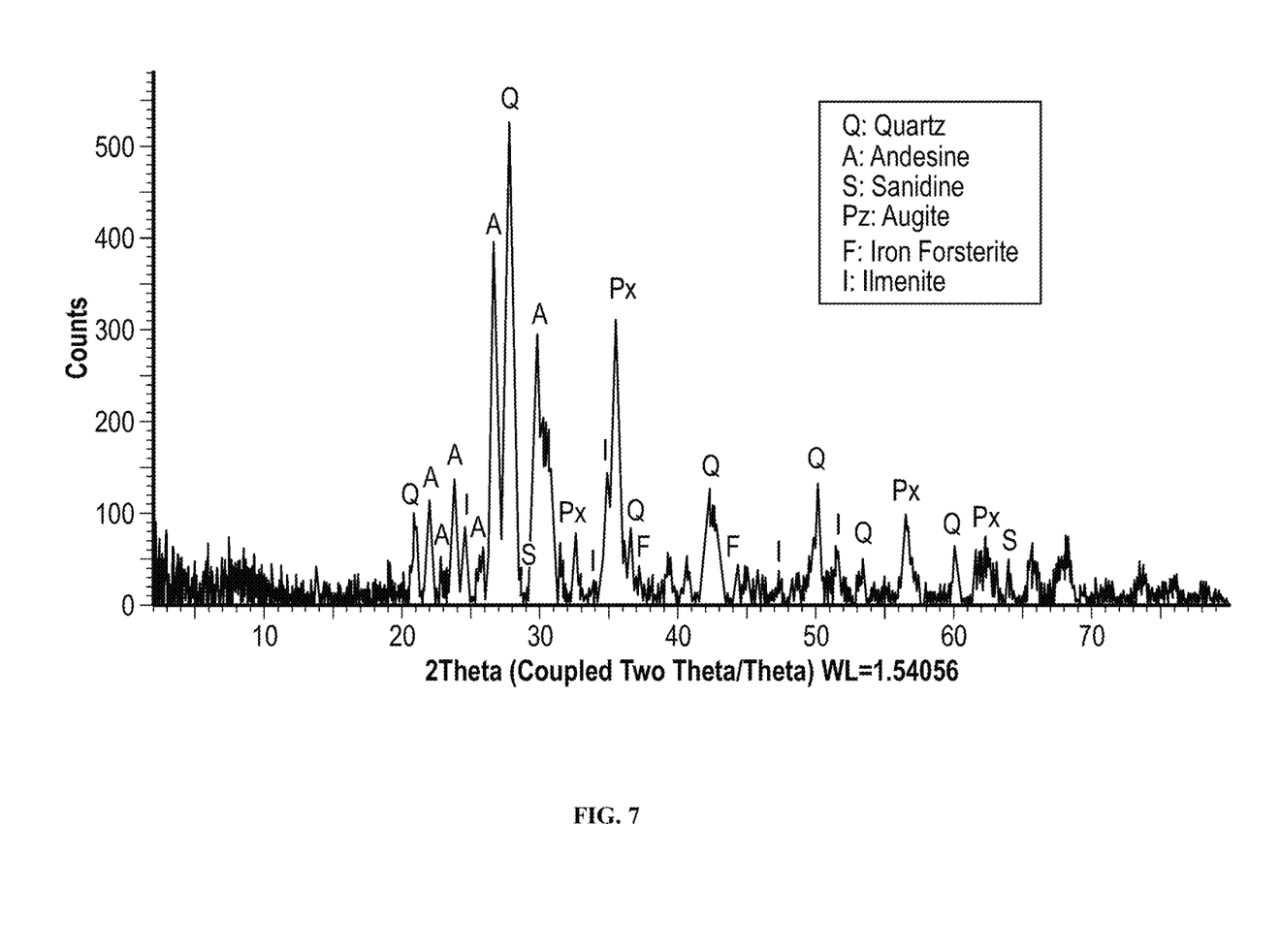
FIG. 7 demonstrates the XRD diffraction pattern of basalt powder from the formulations.

From the results of the X-ray diffraction spectrum (FIG. 7), it was identified that BP is composed mainly of Andesine (37.8%), Augite (27.9%), Orthoclase (11.4%) and Quartz (9.9%), although it also has minor mineral phases composed of Sanidine (5.4%), Magnetite (3.1%), Ilmenite (2.5%), Iron Forsterite (1.6%) and Goethite (0.3%).

The BET specific surface area of BP (5410 m$^2$/kg) with class G cement (770 m$^2$/kg) demonstrates that BP has a higher specific surface area and smaller particle size.

Pre-Preparation of the Composition:

The API cement composition of class A-H and ASTM with additives comprising BP must be prepared prior to use, by the dry blending method, at a concentration of 0.01 to 9.99% by weight of cement (dry base).

Dry mixing is a simple unit operation, in which the physical mixture is carried out between the powder components (base cement and BP), until obtaining a mixture with a homogeneous appearance. This process can be carried out either by the company in the Oil and Gas segment, or by the cement company that currently supplies class G cement for well cementing operations.

Cement pastes added with BP should be prepared as it is currently done, from the mixture of dry cement with hydration water (water/cement ratio from 0.3 to 0.5) and other total additives in a sufficient amount (0.001 to 30% by weight of cement), according to the characteristics of the tank and current regulations, so that the cement paste presents characteristics of pumpability, setting time, density and adequate mechanical strength for the depth and conditions of the reservoir (temperature from 4° C. to 260° C. and pressure up to 34 MPa) of the section that is undergoing the cementing, re-cementing and/or plugging process.

For example, when applied in reservoirs that have a temperature higher than 105° C. (221° F.), NBR-9831 determines the "composition and classification requirements for CPP-AT cement (Portland cement for high temperature wells)". In these cases, CPP-AT cement is a hydraulic binder obtained by a dry, uniform and homogeneous mixture, comprising, in addition to other additives, crystalline silica in concentrations ranging from 26 to 29%, and CPP-class G with high resistance to sulfates (HRS) or CPP of a special class of moderate resistance to sulfates (MRS), in a previously defined mass proportion, according to the specifications of the standard. In practice, the reported use reaches up to 40%.

Different concentrations of API class G cement paste formulations added with 0.25% (BP 0.25) and 0.50% (BP 0.50) of basalt powder were evaluated by a series of analytical methods before and after the exposure to $CO_2$. Within the BP range of the evaluated formulations (0.25% and 0.50%), no significant alterations were identified in the characteristics of the fresh cement paste comprising BP, and such a processing is suitable for cementing operations (onshore and offshore) as commonly processed. Thus, the handling of the powder mixture (class G cement+BP), the preparation of the paste with the mixture of water and additives, and the pumping operation to the wells, can be carried out without any alterations to the procedures currently practiced in relation to the technology currently in operation in well cementing. In this way, the cement paste with basalt powder will be pumped for primary and secondary cementing, recovery and/or plugging operations of wells drilled in subsurface geological formations (onshore and offshore).

Process for Obtaining the Hydraulic Cementitious Composition

Preparation of Basalt Powder (BP)

The BP was obtained by milling the civil construction aggregate in a De Leo 0907 ball mill, for 60 hours, with a rotation of 150 rpm in an external cylinder of 17.8×17.8 cm. The load of the milling steel balls was: Ø50 mm balls (5 units), Ø40 mm (5 units), Ø32 mm (5 units), Ø15 mm (5 units), Ø25 mm (24 units), Ø19 mm (15 units) and Ø10 mm (21 units). After milling, the powder was hand sieved through a #200 mesh screen, followed by #230, #270 and #325 mesh. Thus, only the fraction passing through the #325 mesh sieve was used as SCM to compose the cement paste formulations of the present invention.

Mixing Base Cement with Basalt Powder (BP)

API class G cement formulations added with basalt powder are prepared prior to the cement paste preparation process (mixing with water and additives) using the dry blending method. This process is a simple unit operation, in which the physical mixture is carried out between the powder components (cement and BP) until obtaining a mixture with a homogeneous appearance.

Preparation of the Cement Paste with Additives

All the formulations are prepared following the recommendations of API 10A, API 10B and ABNT NBR 9831 standards. The mixing water is calculated only based on the dry cement fraction (water/cement ratio of 0.44), wherein the BP content is not balanced. To prepare the cement paste, the cement mixture with BP is added to the water in a mixer in up to 15 seconds at 4,000 rpm, followed by a second mixing cycle of 35 seconds at 12,000 rpm.

Methodology

Proof Bodies

After the procedure of mixing and obtaining different formulations of pastes with additives, at different concentrations, the obtained mixtures of cementitious materials were poured into molds, followed by curing in a thermostatic bath (65° C. and atmospheric pressure) for 14 days. After wet curing, the test specimens of cement paste were cut to dimensions of height equal to twice the diameter, suitable for the degradation test in a $CO_2$-rich medium. A part of the samples (samples not subjected to $CO_2$ degradation) was reserved in a calcium hydroxide solution, while the other samples ($CO_2$ degraded samples) are used for the $CO_2$ degradation experiments. The control sample used consisted of a standard base cement mixture, without the basalt additive (BP 0.0%).

$CO_2$ Degradation Tests

The $CO_2$ degradation tests of cement pastes were conducted in HPHT (high pressures-high temperatures) pressure vessels. The cement paste samples were exposed to a system with supercritical $CO_2$ and deionized water at 65° C., 15 MPa and defined degradation time. The applied quasi-static environment is reported to be the most suitable model to simulate fluid dynamics in oil and gas and carbon storage (CCS) wells, since continuous flows of fluids permeating between the interfaces (rock-cement paste-production pipe) or through the well materials (rock formation, cement paste, production pipe and/or abandonment plug) are not commonly found. At the end of the experiments, chemical and physical evaluations were carried out, and the results were compared with the respective samples not subjected to $CO_2$ degradation.

Pozzolanic Activity Index Analysis

The most common method of determining the pozzolanic activity currently used is through the resistance activity index according to the American standard ASTM C311, by applying the compression strength test on a mixture of cement and the pozzolanic material. This test is considered indirect and does not provide information about the pozzolanic material itself. Therefore, the result depends on the chemical and physical characteristics of the used cement, the curing methodology, the cement mixture preparation procedure and the pozzolan characteristics (e.g., specific contact area). Furthermore, it is widely known that the $CO_2$ degradation process can change the physicochemical properties of the cement paste, which makes this determination method inefficient. Furthermore, the Fratini's method is the standard method specified by the European standard NP EN 196-5. The same is the most recommended to measure the pozzolanicity of pozzolanic Portland cements, although it is also used to qualitatively evaluate a given mixture of cement and pozzolan. The chemical method is based on the dissolution of lime and alkali hydroxides derived from the hydration of the cement phases, when the solution comes into contact with the hydrated cement paste. The method, therefore, directly depends on the degree of hydration of the cement paste and the surface area of the materials, which can be modified by the type of cement used, keeping the comparison between SCM in general also inefficient.

The direct determination by Chapelle's method is used as a standard method of the Association Française de Normalization (AFNOR—standard NF P 18-513/2010), in which it specifies and selects metakaolin for addition to concrete. In Brazil, the method was standardized by ABNT—Associação Brasileira de Normas Técnicas (NBR 15895: 2010), and its application to natural and artificial pozzolans is allowed. The method eliminates conflicts observed in other methods, such as the use of different types of cements and materials from undetermined surface areas. Furthermore, it allows a quantitative analysis of the pozzolanic activity of the SCM.

The modified Chapelle's method evaluates the pozzolanic activity of SCM based on the indirect measurement of portlandite consumption throughout the hydration process, making it possible to verify the role that BP will have in the formulation of the cement paste. The greater the consumption of portlandite, the greater the formation of secondary mineral phases in the cement matrix. These reactions influence the chemical and physical properties of the cement paste, reducing porosity, increasing compression strength and reducing chemical $CO_2$ degradation.

To evaluate the pozzolanic activity of basalt powder, the modified Chapelle's method was applied following the recommendations of NBR 15895: 2010. The pozzolanic activity of a supplementary cementitious material (SCM) is estimated from the calcium hydroxide content fixed by the Chapelle's method, expressed in milligrams (mg) of $Ca(OH)_2$, consumed per gram (g) of mineral. As defined by Raverdy et al. (1980), 330 mg $Ca(OH)_2$ is a threshold value for an SCM to be considered as a pozzolanic material with high activity.

Specific Surface Area Analysis

The analysis of the specific surface areas of cement and basalt powder by BET (Brunauer, Emmett and Teller) and Langmuir isotherms was performed on the surface area and porosity analyzer TriStar II Plus. The samples were previously submitted to a degassing system at high vacuum for 3 h to 24 h, and the adsorption analysis was performed with liquid $N_2$ (−195.85° C.)

X-Ray Diffraction Analysis

The X-ray diffraction analysis was performed using a Shimadzu diffractometer (XRD 700) at 40 kV voltage, 30 mA current with Cu-Kα radiation and a 0.02° scan step at $\theta$-$2\theta$ ranging from 2 to 80°.

Microscopic Analysis

The microscopic analysis by Scanning Electron Microscope with Energy Dispersive Spectroscopy (SEM-EDS) was performed in Inspect F50 (FEI) to (i) characterize the morphological structure of BP and evaluate the chemical composition of some microconstituents, (ii) characterize the structure of the cement paste, (iii) evaluate the extent of the degraded layer in the cement samples after the reaction with supercritical $CO_2$ and (iv) analyze the elemental profile of the cement paste samples after the degradation process using linear scanning and elemental mapping.

Test with Phenolphthalein Solution

For the analysis of the $CO_2$ degraded layer, the test specimens were cut longitudinally with a low-speed milling cutter and diamond cutting disc. Then, phenolphthalein (2%) in ethyl alcohol-water solution (48:50% v) was sprayed on the samples to evaluate the extent of the $CO_2$ degradation reaction of the hardened cement paste. The used test is based on the interaction of the phenolphthalein solution with the alkaline reserve of the cement (portlandite). Thus, the indicator highlights the boundary between the $CO_2$-non-degraded area of the cement paste samples (pink fraction) and the degraded layer (non-pigmented fraction).

$CO_2$ Degraded Layer Analysis

The estimation of the layer thickness of the $CO_2$ degraded cement paste was performed using an image processing software based on the pigmented areas identified in the images of the test specimens sprayed with the phenolphthalein solution. For each formulation, three cement test specimens with various measurements are used to obtain the average thickness of the degraded layer.

Compression Test

The compression strength analysis was performed on the cement paste test specimens using a universal testing machine (UTM). Compression test parameters, such as analysis speed, dimensions of test specimens and number of repetitions, meet the specifications described by the ASTM C39 standard.

X-Ray Microtomography (Micro-CT)

X-ray microtomography analyzes were performed on the cement paste samples using the Skyscan 1173 X-Ray Microtomograph (Bruker), following the manufacturer's recommendations. From the Micro-CT data, the degraded volume and porosity are estimated.

Results:

Microscopic Analysis of BP

Figure 1:
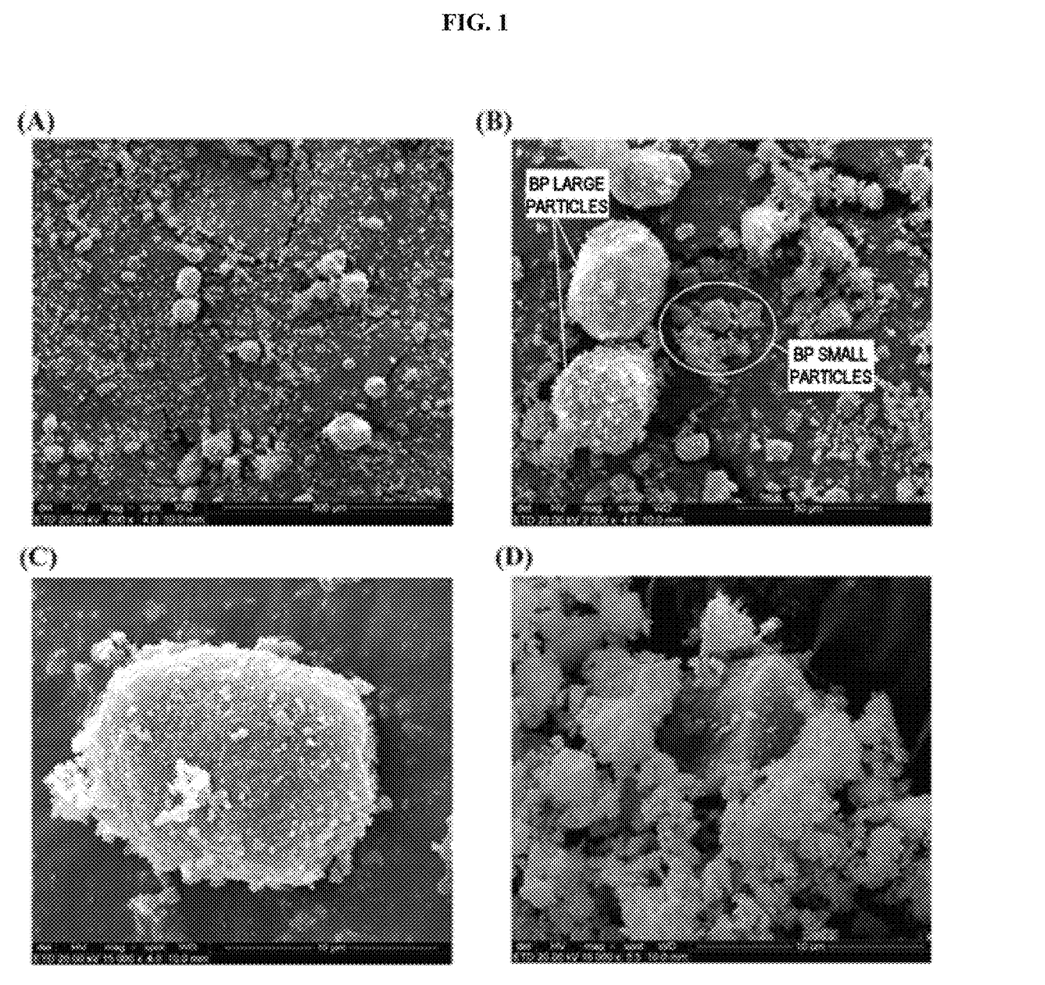
FIG. 1 demonstrates scanning electron microscopy (SEM) images of different morphologies of basalt powder at (A) 500×, (B) 2000× with indication of smaller and larger particles, (C) 15000× of larger particles and (D) 16000× of the smallest particles.

The basalt powder (FIG. 1) showed different sizes of particles with irregular shape, rough surface and varied granulometry. While larger particles have undefined rounded edges, which may be related to the basic abrasion fragmentation mechanism after the ball mill milling process, smaller particles, although irregularly shaped, have a rough surface and sharper edges, which may be associated with the different cleavage planes due to the diversified mineralogical composition of the basalt powder.

Specific Surface Area and Average Particle Size Analysis by BET

When comparing the BET specific surface area of basalt powder (5410 $m^2$/kg) with class G cement (770 $m^2$/kg), it was observed that BP has a higher specific surface area and smaller size of particle.

While the irregular shapes of the smaller particles provide a high relative specific surface area, contributing to the reduction of hydration of the cement paste and to the reduction of the pore size and residence capacity of the cured material, the slightly rounded edges of the larger particles improve the flowability of the cement paste and reduce the stress concentration of the material, making the cement paste sample more difficult to crack. In addition, particles with sharper edges generally create more resistance to the rheology of the mixture and increase the water demand for cement hydration due to the increase in specific surface area. However, the small content of BP added to the cement formulation of the invention resulted in a slight difference in the flowability of the cement paste without the addition of BP.

X-Ray Diffraction Analysis

The mineral composition of the BP defines its reactivity during the hydration process, the role played by the additive in the cement formulation, and indicates which mineral phases will be generated after the curing process. From the results of the XRD pattern, it was identified that the BP is composed mainly of Andesine (37.8%), Augite (27.9%), Orthoclase (11.4%) and Quartz (9.9%), while it also presented minor mineral phases composed of Sanidine (5.4%), Magnetite (3.1%), Ilmenite (2.5%), Iron Forsterite (1.6%) and Goethite (0.3%). All the identified minerals have been previously reported in basalt powders applied as SCM in cement and concrete formulations, and indicate that PA may have a slightly pozzolanic activity throughout the hydration process, consuming portlandite cement and increasing the production of C-S-H phases, and/or presenting a filler effect due to the smaller particle size, reducing the porosity of the cement paste by occupying the voids of the cured material.

Pozzolanic Activity Index Analysis

Based on pozzolanic activity, the BP consumed 180.2 mg $Ca(OH)_2$ during the modified Chapelle's test, lower than the 330 mg $Ca(OH)_2$ defined by Raverdy et al. (1980) as a threshold value for an SCM to be considered a pozzolanic material with high activity. Although BP has a large amount of minerals rich in silica and alumina, the low pozzolanic activity was also identified by other authors, and is explained by the lack of glass phases and the presence of highly crystallized minerals. Thus, based on the results of the characterization, the basalt powder can be used as filler-pozzolanic material, being partially consumed in the cement hydration process, occupying the porous spaces of the material.

It is known that the curing conditions (temperature and pressure) can influence the properties of the cement sheath. To prevent strength setback in wells operating at temperatures above 110° C., 35% to 40% crystalline silica is added relative to the weight of cement (b.w.o.c.). Unlike crystalline silica, an additive with high pozzolanic activity, BP presents low reactivity and a large inert mineral fraction. Thus, due to the low pozzolanic activity of basalt powder, it is unlikely that BP can be used to replace crystalline silica as an additive in high temperature well cement formulations. Therefore, future works should evaluate the feasibility of using mixtures of crystalline silica and basalt powder in cement from high temperature CCS wells, as well as studying the effect of $CO_2$ on the chemical resistance and mechanical strength of these formulations.

Degraded Layer Test Results and Volume Degraded by $CO_2$ Action

Figure 2:
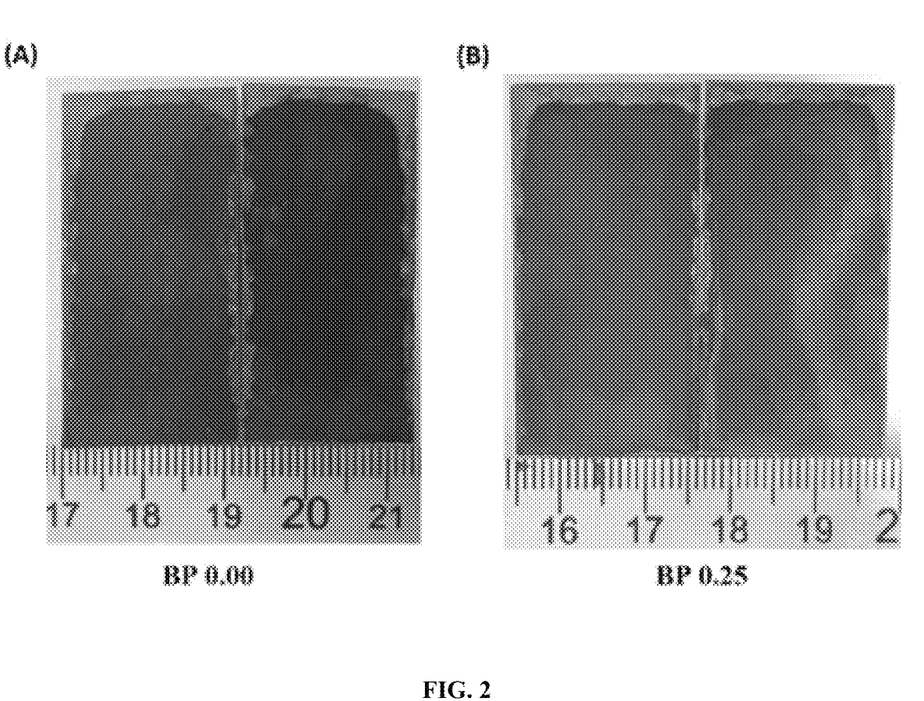
FIG. 2 demonstrates the degraded layer obtained after the exposure of the cement paste to the $CO_2$-water medium at 65° C. and 15 MPa, with (A) control BP formulation 0.00 and (B) BP formulation 0.25.

After the preparation of the cement paste formulations and the cure with thermostat, the $CO_2$ degradation tests were carried out to evaluate the chemical resistance of the different formulations. FIG. 2 demonstrates the images obtained from samples BP 0.00 (control-class G cement reference) and BP 0.25 (cement paste containing 0.25% BP by weight) after exposure to saturated water with $CO_2$ at 15 MPa and 65° C., illustrating the chemical change undergone by the test specimens and the depth of the degraded layer, highlighted using the phenolphthalein solution.

From the results of $CO_2$ degradation, it was observed a typical behavior of $CO_2$ degradation of the cement matrix from the reduction of the pink area and the increase of the degraded gray area. The pink color observed in the central portion of the cement samples is associated with the interaction of the phenolphthalein solution with the alkaline reserve of the cement paste, which is mainly due to the preservation of the portlandite (CH) fraction, indicating the absence of the $CO_2$ degradation process. On the contrary, the gray portion on the edges of the cement test specimens demonstrates that there is a high consumption of calcium hydroxide (CH), indicating the neutralization of pH and the formation of calcium carbonates ($CaCO_3$).

From the results, it is observed that the class G cement paste reference (BP 0.00—FIG. 2A) shows a greater degraded layer compared with the example of formulation with 0.25% basalt powder (BP 0.25—FIG. 2B). Complementarily to the test described, the X-ray microtomography (Micro-CT) was performed to evaluate the role of BP as a supplementary cementitious material (SCM) in the macroscopic properties of the cement paste, before and after degradation process induced by $CO_2$, and to measure the degraded volume of the cement paste samples. The X-ray microtomography analysis allows the differentiation of microconstituents of the cement paste based on the density difference between the mineral phases. Denser mineral portions, such as calcium carbonate (the main $CO_2$ degradation product of cement), are identified as brighter spots, while lighter micro-constituents, such as entrained air, aqueous solution in the pores, or unchanged portion of cement, are represented as darker spots. Thus, the Micro-CT images of $CO_2$ non-degraded and degraded cement paste formulations are shown in FIG. 3.

Figure 3:
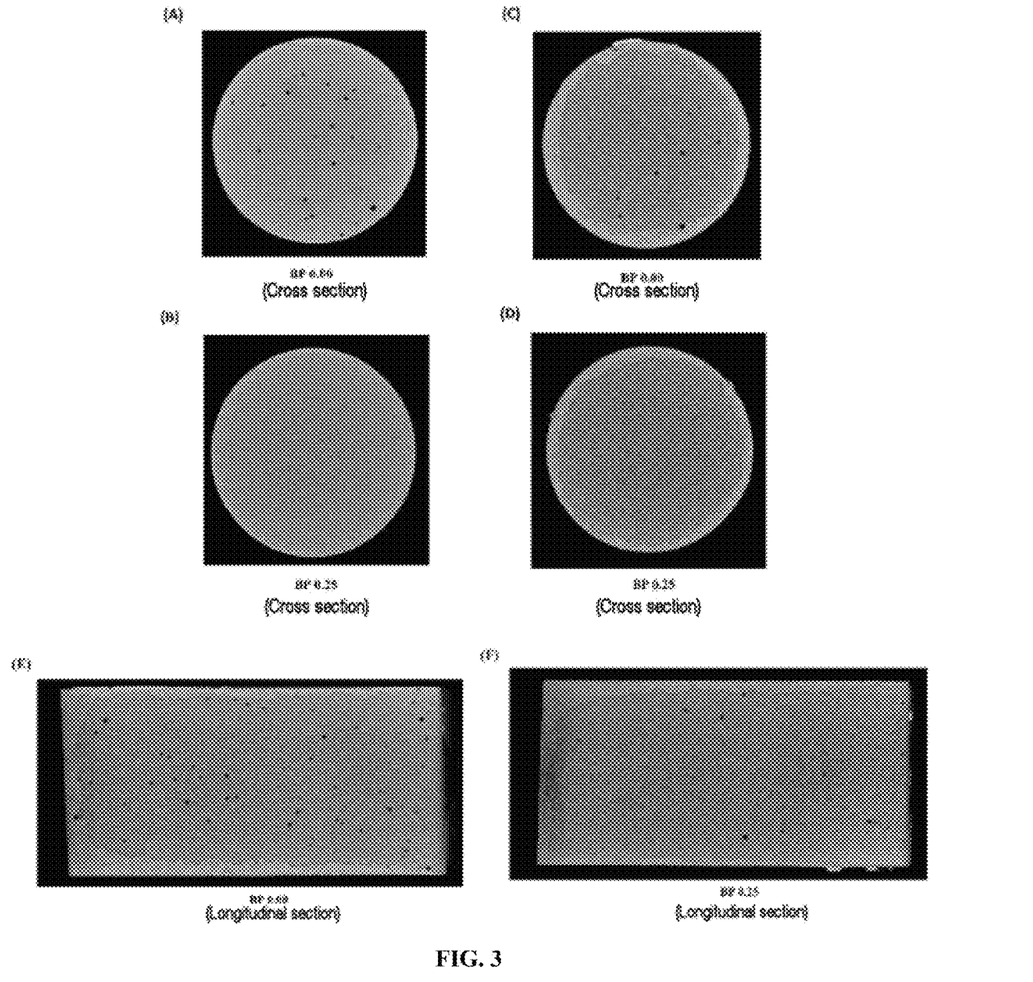
FIG. 3 demonstrates Micro-CT images of the cross-section of the cement paste samples, before the degradation tests, which images are: (A) control BP formulation 0.00 and (B) BP formulation 0.25; cross section of the test specimens after the degradation tests, which images are: (C) control BP formulation 0.00 and (D) BP formulation 0.25; longitudinal section of the test specimens after the degradation tests, which images are: (E) control BP formulation 0.00 and (F) BP formulation 0.25.
Figure 8:
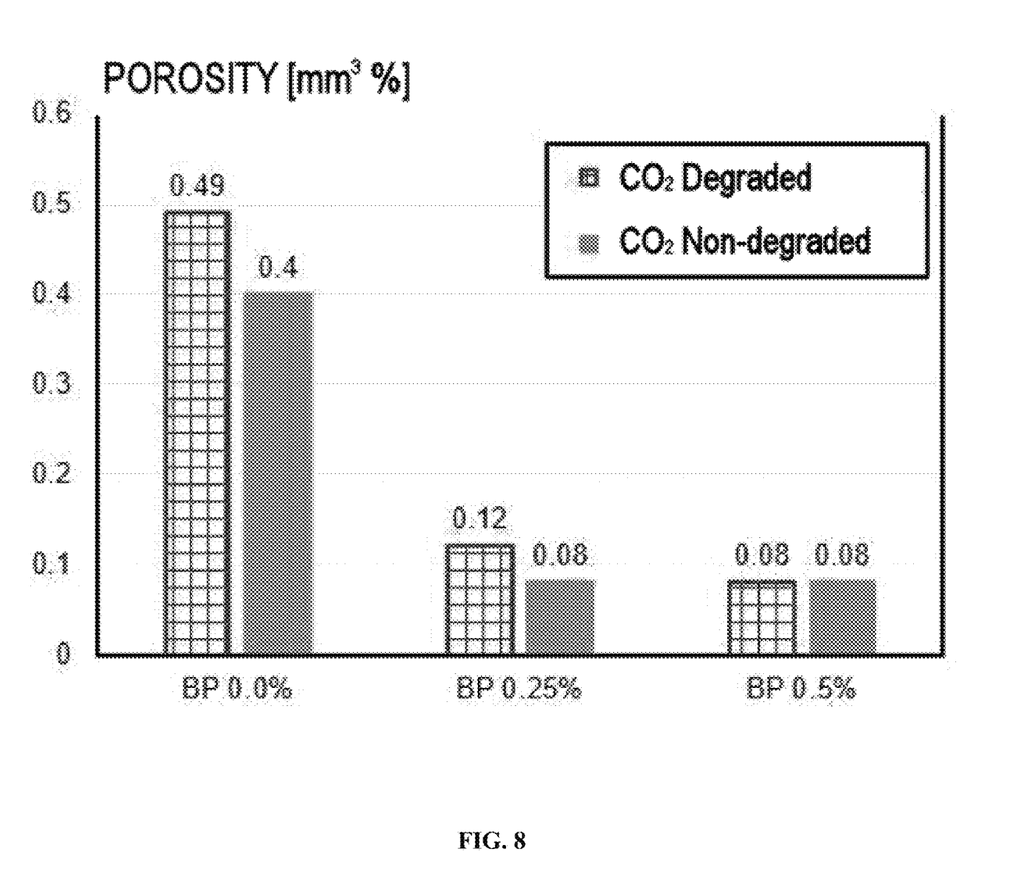
FIG. 8 demonstrates the quantitative analysis, in $mm^3$%, of the porosity of the hydraulic cement material comprising basalt powder, in the different formulations, before and after $CO_2$ degradation.

In FIG. 3, it can be observed that the basalt powder induces a reduction in the macroporosity of the test specimens and reduces the amount of air incorporated in the cured cement paste. In the image, BP 0.25 (FIG. 3B) does not present less dense spots (darker spots), while in the image of BP 0.00 (FIG. 3A) there are signs consistent with the presence of large pores, confirming that the addition of BP can reduce the overall porosity of the cement paste. Thus, the reduction in macroporosity observed in BP 0.25 (FIG. 3B), when compared to the reference cement (BP 0.00—FIG. 3A), confirms that the addition of BP refines the porous structure of the cement, increasing the strength of the material to the intrusion of acidic fluids such as $CO_2$. For comparison purposes, the Micro-CT analysis was performed on the same cement samples after exposure to $CO_2$, and the results are also shown in FIG. 3C-F. From FIG. 3C-F, it can be observed that the extent of the area with the highest density (degraded zone) is more evident in the BP 0.00 sample (reference class G cement) than in the BP 0.25, indicating that even a small amount of basalt powder can significantly reduce the porosity and permeability of the material (FIG. 8) and increase the cement resistance to $CO_2$ degradation.

In order to confirm the result obtained, the chemical resistance of cement formulations (BP 0.00, BP 0.25 and BP 0.50) was evaluated by measuring the degraded layer (CL) and the degraded volume (CV). As the degradation fronts do not advance homogeneously along the sample, the CV was also estimated to obtain a more accurate measurement of the degraded fraction of the cement samples. Therefore, to evaluate the results of different analyses, the degraded layer thickness estimated by the phenolphthalein test and the degraded volume are shown in FIG. 4.

Figure 4:
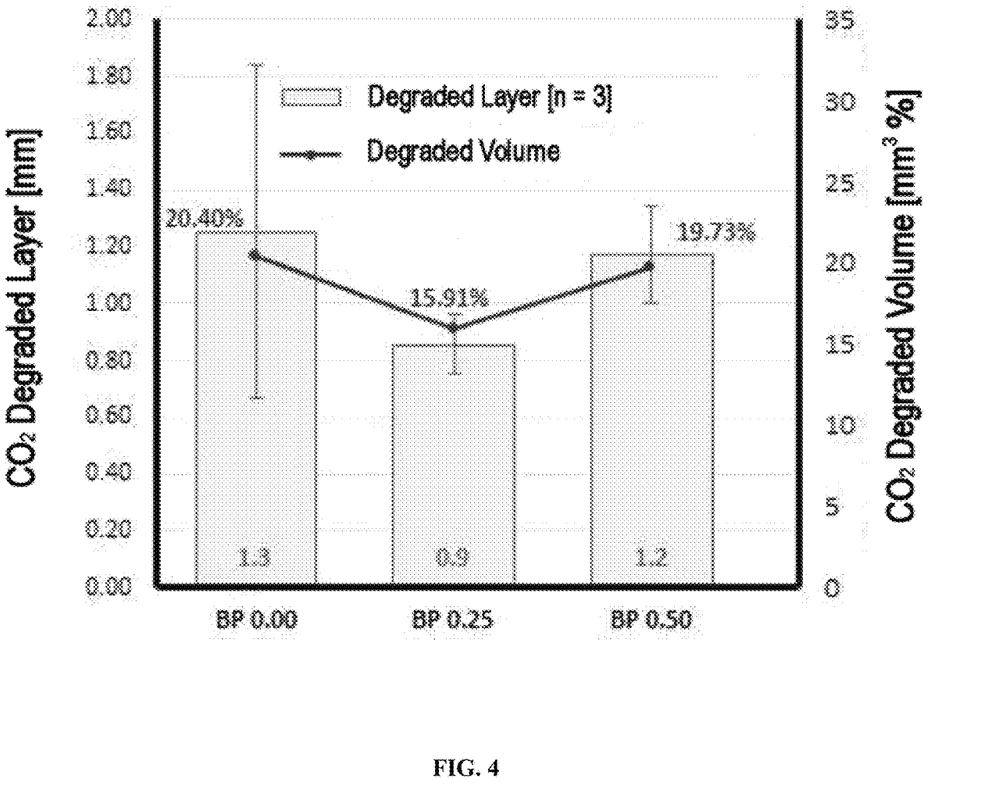
FIG. 4 demonstrates the thickness of the degraded layer, from the phenolphthalein test, and the degraded volume, from the Micro-CT test, of the cement paste samples after the $CO_2$ degradation test.

FIG. 4 shows that, from the addition of BP in the cement paste formulation, there is an initial reduction of the degraded layer in relation to the reference (BP 0.00), with the best result obtained for the formulation containing 0.25% by weight of basalt powder (BP 0.25). Then, the extent of the degraded volume decreases from BP 0.00 to BP 0.25 and BP 0.50, demonstrating that even the addition of small amounts of basalt powder is already capable of increasing the resistance of the reference class G cement paste (BP 0.00) against the chemical $CO_2$ degradation. Based on these results, we conclude that cement paste formulations with the addition of basalt powder present better chemical resistance to $CO_2$ when compared to class G cement reference pastes. From the Micro-CT results, it is concluded that the addition of basalt powder increases the resistance of the cement paste to the $CO_2$-rich medium by refining the porous structure and reducing the permeability of the cement sheath.

Accordingly, the formulation with 0.25% Basalt Powder presented the best technical performance (31.2% reduction of the degraded layer), in addition to being the SCM with the lowest production cost (R$ 0.0034 per kilogram), indicating that this formulation is the one with the greatest potential for implantation in the short term. Additionally, this formulation is the one that presents the least technical difficulty of implementation in large-scale cementing operations, since the technological modifications to the preparation of the cement paste, in relation to current operations, result in minimal modification in the production chain of formulations, and no alteration to the cementing practices/equipment currently performed on the platform/field.

Mechanical and Porosity Tests

It is well known that porosity can influence both microscopic (e.g., $CO_2$ permeability in the medium) and macroscopic properties, such as the compression strength of a cementitious material. Observing that the addition of BP modifies the porosity of the cement paste formulations (FIG. 8), a joint evaluation of the porosity evolution with the mechanical strength of the cement pastes was then carried out. From FIG. 8, it is possible to observe that the porosity of the non-degraded samples (IP) ranged from 0.49 to 0.08 mm$^3$%, while the porosity of the degraded samples (FP) ranged from 0.40 to 0.08 mm$^3$%. As previously discussed, for both samples (degraded and non-degraded), there is an initial tendency to reduce porosity, which can be attributed to the filler effect promoted by the basalt powder, the blocking effect of the pores and the consequent refinement of the porous structure of the cement paste. This characteristic is observed from the reference sample (BP 0.00-0.49 mm$^3$%) to the test specimens of cement paste BP 0.50 (0.08 mm$^3$%), which has the lowest value of initial porosity between the evaluated formulations.

Figure 5:
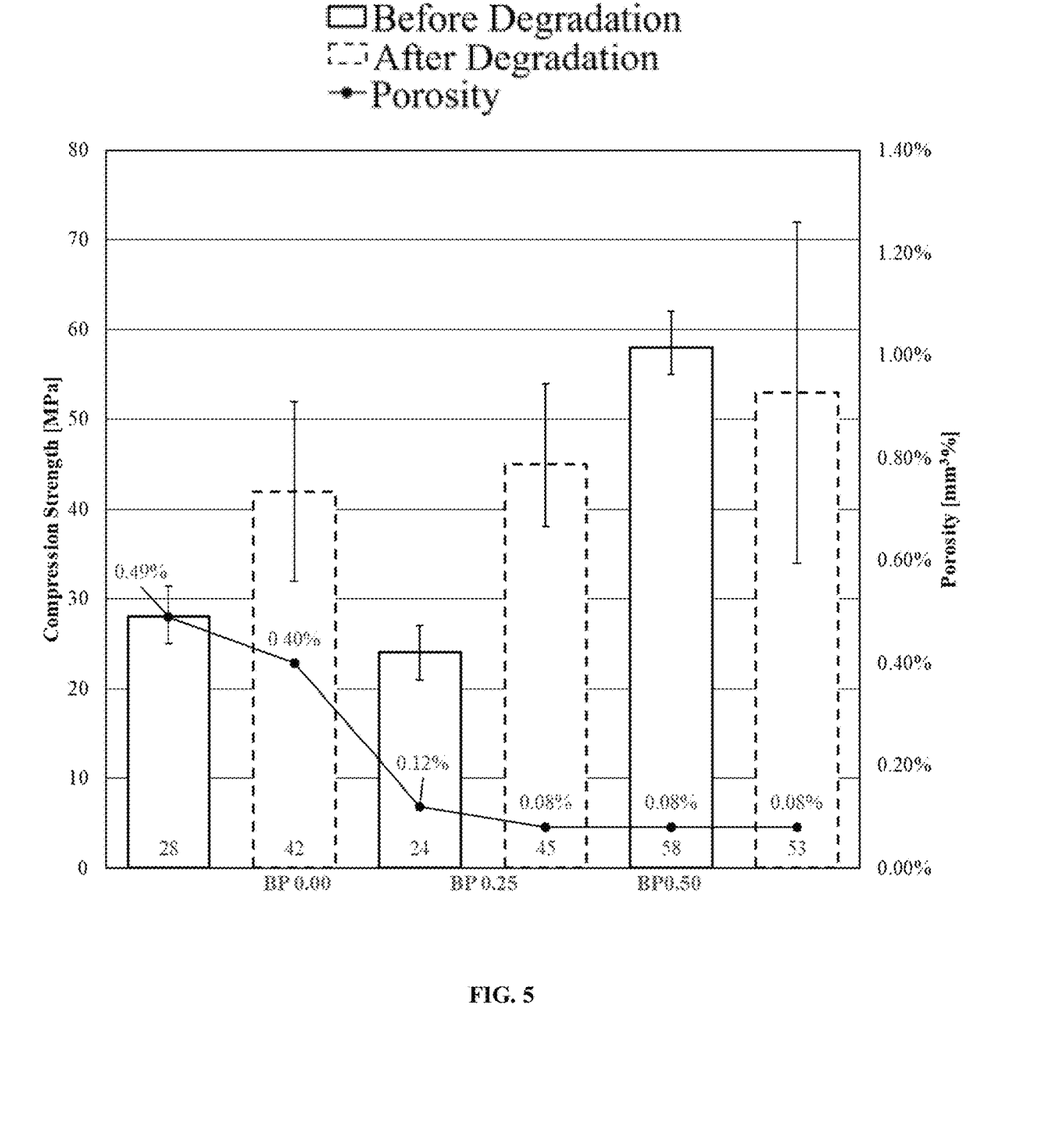
FIG. 5 demonstrates the porosity and compression strength parameters of cement paste formulations with basalt powder, before and after degradation.

The influence of the addition of basalt powder on the mechanical strength of cement paste formulations was evaluated before and after the $CO_2$ degradation process. The compression strength, after the degradation process, is an important property to be measured, since the precipitation of calcium carbonate can positively influence the porosity of the cement paste at the beginning of the degradation process, but it can change the final compression strength of material. In FIG. 5, it can be observed that the compression strength of the non-degraded samples ranged from 23.7 to 57.7 MPa, while the compression strength of the degraded samples ranged from 42.0 to 52.7 MPa. From FIG. 5, it is possible to observe a positive effect of basalt powder on the initial compression strength of test specimens of cement paste with a BP content of 0.50% (BP 0.50), while the sample with the addition of 0.25% of BP (BP 0.25) technically presents the same compression strength as the reference sample (BP 0.00). Regarding the influence of the carbonation phase on the mechanical properties of the cement paste, both formulation examples (BP 0.25 and BP 0.50) presented a final compression strength (degraded samples) higher than the initially measured one (non-degraded samples). From the disclosed results, it can be concluded that the addition of basalt powder in the cement paste can modify the microstructural properties of the cementitious compound, such as porosity (FIG. 8), and improve its chemical resistance without compromising or improving the mechanical performance of the material (FIG. 5).

Final Considerations

The composition comprising 0.25% of Basalt Powder showed the best technical performance (31.2% reduction of the degraded layer) in addition to being the SCM with the lowest production cost (R$ 0.0034 per kilogram), indicating that this formulation is the one with the greatest potential for implementation in the short term. Additionally, this formulation is the one that presents the least technical difficulty of implementation in large-scale cementing operations, since the technological modifications to the preparation of the cement paste, in relation to current operations, result in minimal modification in the production chain of the cement pastes of the formulations, and no change in cementing practices/equipment currently performed on the platform/field. In this way, the present technology can be applied immediately, since there is no need to adapt the structures and methods of well cementing operations. In addition, there is a medium to long-term financial gain due to savings with corrective interventions throughout the life cycle of the wells.

The companies of the segment and those skilled on the art will value the knowledge presented herein and will be able to reproduce the invention in the presented embodiments and in other variants encompassed in the scope of the attached claims.

The invention claimed is:

1. A method of cementing, comprising the steps of:
    a) obtaining a cementitious composition comprising basalt powder (BP) as a supplementary cementitious material (SCM) in dry base cement powder, wherein the basalt powder comprises a particle size equivalent to the fraction passing through a #325 mesh sieve, up to 0.044 mm and 4000-6000 m$^2$/kg;
    b) mixing the cementitious composition with water and optional additives to form a hydraulic cementitious composition; and
    c) performing primary cementing, secondary cementing, recovery, and/or plugging of a subsurface reservoir, using the hydraulic cementitious composition.

2. The method according to claim 1, wherein the cementing in step c) is performed on an injection, exploration, monitoring, production and/or enhanced recovery reservoir.

3. The method according to claim 2, wherein the reservoir is configured for fluids comprising a concentration of a gaseous fraction of $CO_2$ that is between 5% and 100%.

4. The method according to claim 2, wherein the reservoir is configured for carbon capture and storage (CCS).

5. The method according to claim 1, wherein step c) is performed at a temperature between 4° C. and 260° C. and a pressure between atmospheric pressure and 34 MPa.

6. The method according to claim 1, wherein the basalt powder is obtained from the group consisting of artificial basaltic rocks, ballast, chips, crushed stone, coarse aggregate and/or fine aggregate.

7. The method according to claim 1, wherein the basalt powder comprises, components selected from the group consisting of Andesine, Augite, Orthoclase and Quartz, Sanidine, Magnetite, Ilmenite, Iron Forsterite and/or Goethite.

8. The method according to claim 1, wherein the basalt powder comprises a concentration ranging from 0.01 to 9.99% by weight of dry base cement powder.

9. The method according to claim 1, wherein the basalt powder comprises a supplementary cementitious material with pozzolanic activity up to 330 mg of $Ca(OH)_2$ consumption.

10. The method according to claim 1, wherein the particle size of the basalt powder is up to 80% smaller than the class G cement powder.

11. The method according to claim 1, wherein the basalt powder comprises an average specific surface area of 4000 to 6000 $m^2/kg$ and an average particle size of 13,316 to 8,877 Å.

12. The method according to claim 1, wherein the hydraulic cementitious composition comprises a chemical resistance gain to 31.2% to $CO_2$ degradation due to a reduction of porosity and permeability in relation to the hydraulic cementitious composition without the basalt powder.

13. The method according to claim 1, wherein there is a decrease in permeability and porosity of the hydraulic cementitious composition in an acidic medium in subsurface.

* * * * *